(No Model.)
W. F. WHEELER.
FILTER.
No. 264,011. Patented Sept. 5, 1882.
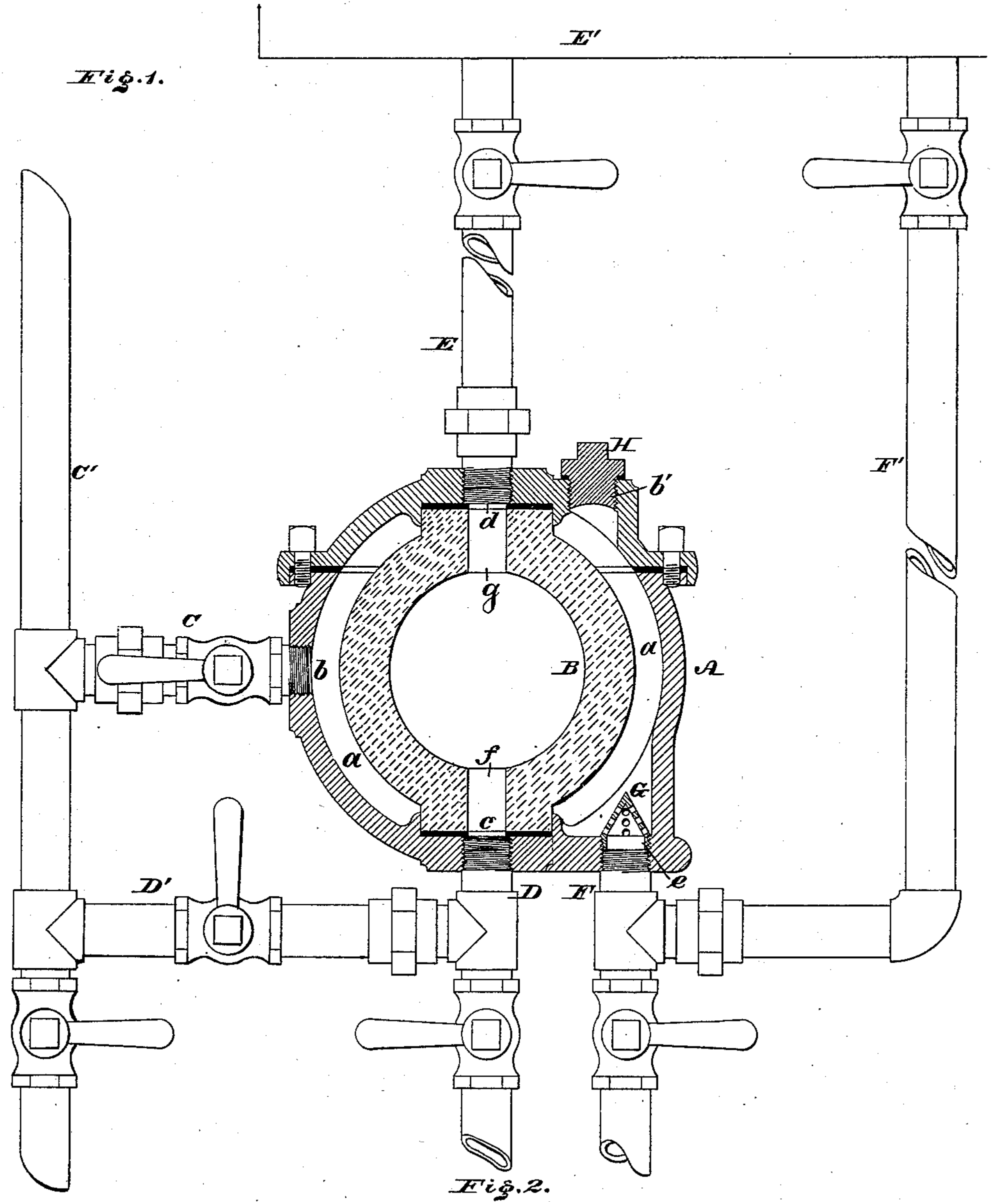
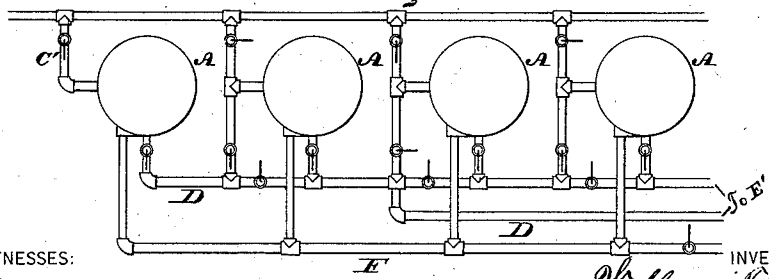
WITNESSES:
A. P. Grant,
W. F. Kircher
INVENTOR:
William F. Wheeler,
BY John A. Wiedersheim,
ATTORNEY.
N. PETERS, Photo-Lithographer, Washington, D. C.

UNITED STATES PATENT OFFICE.

WILLIAM F. WHEELER, OF PHILADELPHIA, PENNSYLVANIA, ASSIGNOR TO THOMAS M. GALBREATH, OF ATLANTIC CITY, NEW JERSEY.

FILTER.

SPECIFICATION forming part of Letters Patent No. 264,011, dated September 5, 1882.

Application filed April 22, 1882. (No model.)

*To all whom it may concern:*

Be it known that I, WILLIAM F. WHEELER, a citizen of the United States, residing in the city and county of Philadelphia, State of Pennsylvania, have invented a new and useful Improvement in Filters, which improvement is fully set forth in the following specification and accompanying drawings, in which—

Figure 1 is a vertical section of the filter embodying my invention. Fig. 2 is a view of a number of filters coupled and communicating with each other.

Similar letters of reference indicate corresponding parts in the two figures.

My invention consists of a filter so constructed that the chamber to contain the liquid to be filtered or rectified is separated from the chamber to contain the filtered liquid by a partition formed of porous substance sufficiently strong to resist the necessary external and internal pressure, and at the same time to allow the liquid to pass quite free from sediment or other foreign matter.

Referring to the drawings, A represents a shell or casing formed of two parts firmly bolted or otherwise secured together to make a water-tight joint, and having within it a hollow body, B, of porous material, a space, *a*, existing between the shell and body. The body B is provided with projecting portions or tenons, which enter recesses in the inner side of the shell and tend to hold the shell and body together. In the shell are openings *b c d e*, and in the porous body are openings *f g* at opposite places, the opening *g* being closed when only one opening is required, the opening *f* communicating with the opening *c* of the shell, and the opening *g* communicating with opening *d* of said shell.

C represents a pipe which is connected with the shell at the opening *b*, and forms a communication between the supply-pipe C′ and the space *a* of the filter.

D represents a pipe for filtered water, which is connected with the shell at the opening *c*, and communicates with the opening *f* of the body B.

E represents a pipe for filtered water, which is connected with the shell at the opening *d*, and communicates with the opening *g* of the body B and an open reservoir, E′, suitably located.

F represents a pipe for unfiltered water, which is connected with the shell at the opening *e*, and communicates with the space *a*, and has at its inner end a strainer, G, the several pipes being provided with cocks or valves. In the upper part of the shell is also an opening, *b*′, which is occupied by a plug, H, whereby access is had to the space *a* for filling it with pieces of charcoal or other purifying material.

The supply-pipe C′ and pipe D for filtered water may be connected by a pipe, D′, and the reservoir E′ and the pipe F for unfiltered water may be connected by the pipe F′, said pipes D′ F′ being provided with suitable cocks or valves, and the couplings or connections of all of the pipes are suitably packed. The use of these connecting-pipes D′ F′ and stop-cock of the pipe E is to reverse the action of the filter when desired.

The filter is secured in position, say, to the wall over the kitchen-sink, and connected to the cold-water-supply pipe C′ by means of the pipe C, and may by means of a suitable pipe and cock be connected to the hot-water pipe, so that cold or hot water may be filtered.

The pipe D has its outlet within convenient reach, and when it is desired to draw the filtered water through said pipe D the cocks of the pipes C D are opened and the cocks of the other pipes are closed. The water first enters the space *a* and agitates the charcoal or other material therein, so that it is thereby purified, after which it passes through the wall of the body B and enters the interior space of said body, from whence it enters the pipe D through the openings *f c*, and so passes out, the sediment or foreign matters remaining in the space *a*. By closing the cocks of the pipes D and opening that of the pipe E, the filtered water will pass through the pipe E and so enter the reservoir E′. By opening the cock of the pipe F and closing that of the pipe E the water will flow out unfiltered through said pipe F, and likewise wash from the space the collected sediment. By closing the cocks of the pipes C D E F and opening the cock of the pipe D′ the water from the supply-pipe may directly enter the pipe D and so pass out, said pipe D acting as the ordinary cock of the hydrant in the kitchen or elsewhere. By closing the cocks of pipes C D E D′ and opening the cocks of the pipes F F′ the filtered water in the reservoir may be withdrawn through said pipe F, it being evident that the filtered water in the reservoir may also be directed through the pipe E and passed from the filter through the openings *f c* and pipe D, or driven through the body B into the space *a* and pipe F, carrying with it any sediment in said space; and in fact there may be various other ways of directing the water through and from the filter in a filtered and unfiltered condition by properly opening and closing the relative cocks of the several pipes.

The strainer G, which is secured to the pipe F at the end opening into the space *a*, serves to prevent the escape of the charcoal or purifying material in said space.

The hollow body B is formed of clay, sawdust, iron filings, charcoal, &c., properly molded and burned, the effect whereof is to make the body porous; or said body may be made of wood, or wood-pulp suitably shaped and carbonized; and, if desired, the body may be protected by wire-gauze or other netting, without, however, interfering with the filtering operation.

In Fig. 2 I show a number of filters coupled and communicating with each other, so as to obtain a greater filtering capacity in quantity and quality; and it is also evident that the filter may be used in reverse order to that stated—viz., the admission of the unfiltered water first to the body B by means of the pipe D′, and the discharge of the same from the shell or casing A. In such case the cocks of the pipes E F are closed and the cock of the pipe F′ is opened, thus directing the filtered water to the reservoir through the pipe F′, although the water may be passed out the pipe F, if desired, the cocks of the respective pipes being opened and closed.

I do not limit my invention to the filtration of water, as it may be used for other fluid and the rectifying of spirits, &c.

If desired, a float may be arranged in a suitable tank and connected to a stop-cock of a proper pipe, so as to automatically open said cock and cleanse the filter.

When it is not desired to use the pipe E the opening *d* may be closed by a blind washer or other device clamped between the shell and body or by dispensing with the opening *g*.

Having thus described my invention, what I claim as new, and desire to secure by Letters Patent, is—

1. The filter consisting of a shell, an inner hollow body of porous material, and suitable inlet and discharge pipes, said shell and hollow body being locked together by projecting parts of the one which fit into recesses of the other at opposite points of its circumference, substantially as set forth.

2. The exterior shell and the inner porous body, with a space between them, in combination with the plug H, which is fitted to the opening *b′* of said shell, substantially as and for the purpose set forth.

3. The inner body, B, formed with the openings *f g*, in combination with the exterior shell, A, having openings *b c d*, the pipes C D E, the supply-pipe C′, and reservoir E′, substantially as and for the purpose set forth.

4. The inner body, B, and exterior shell, with the space *a* between them, in combination with the pipes C D E F, the pipe D′, and pipe F′, substantially as and for the purpose set forth.

5. A hollow body of charcoal molded or otherwise shaped into form and adapted for filtering liquids, as set forth.

W. F. WHEELER.

Witnesses:
JOHN A. WIEDERSHEIM,
W. F. KIRCHER.